(12) United States Patent
Strohmüller

(10) Patent No.: US 11,408,575 B2
(45) Date of Patent: Aug. 9, 2022

(54) ILLUMINATION DEVICE FOR A MOTOR VEHICLE HEADLIGHT, AND MOTOR VEHICLE HEADLIGHT

(71) Applicant: ZKW Group GmbH, Wieselburg (AT)

(72) Inventor: Alexander Strohmüller, Ybbs (AT)

(73) Assignee: ZKW Group GmbH, Weiselburg (AT)

( * ) Notice: Subject to any disclaimer, the term of this patent is extended or adjusted under 35 U.S.C. 154(b) by 0 days.

(21) Appl. No.: 17/311,982

(22) PCT Filed: Dec. 21, 2018

(86) PCT No.: PCT/EP2018/086586
§ 371 (c)(1),
(2) Date: Jun. 8, 2021

(87) PCT Pub. No.: WO2020/126031
PCT Pub. Date: Jun. 25, 2020

(65) Prior Publication Data
US 2022/0010939 A1    Jan. 13, 2022

(51) Int. Cl.
*F21S 41/24* (2018.01)
*F21S 43/14* (2018.01)
(Continued)

(52) U.S. Cl.
CPC .............. *F21S 41/24* (2018.01); *F21S 41/141* (2018.01); *F21S 41/322* (2018.01); *F21S 43/14* (2018.01); *F21S 43/241* (2018.01); *F21S 43/315* (2018.01)

(58) Field of Classification Search
CPC ............................ F21S 41/322; F21S 43/315
See application file for complete search history.

(56) References Cited

U.S. PATENT DOCUMENTS 8,866,406 B2 * 10/2014 Gordin ................. F21V 5/04
                                                          315/312
9,772,087 B2 *  9/2017 Marfeld ............... F21V 7/0091
(Continued)

FOREIGN PATENT DOCUMENTS

DE       102015115969 A1    4/2017

OTHER PUBLICATIONS

International Search Report for PCT/EP2018/086586, dated Oct. 9, 2019 (12 pages).

*Primary Examiner* — Eric T Eide
(74) *Attorney, Agent, or Firm* — Eversheds Sutherland (US) LLP

(57) ABSTRACT

The invention relates to a lighting device (1) for a for a motor vehicle headlight and/or for a rear light of a motor vehicle and/or for a signal light for a motor vehicle registration for generating at least two, in particular precisely two, light distributions, or for generating at least two, in particular precisely two different lighting functions, wherein the lighting device (1) comprises an optical element (2) and two light sources (30, 40) —a first light source (30) and a second light source (40), in particular LED light sources—wherein each of the light sources (30, 40) can be controlled independently of the other light source or sources, wherein the optical element (2) is formed from an optically transparent material, and wherein the optical element (2) has a light coupling region (10) and a light exit surface (11), and wherein light of the light sources (30, 40) which is introduced into the optical element (2) via the light coupling region (10) at least partially exits via the light exit surface (11), wherein the light coupling region (10) is formed from a central light coupling surface (100) and a lateral coupling surface (200) on the side, wherein the central light coupling (Continued)

Figure 1:
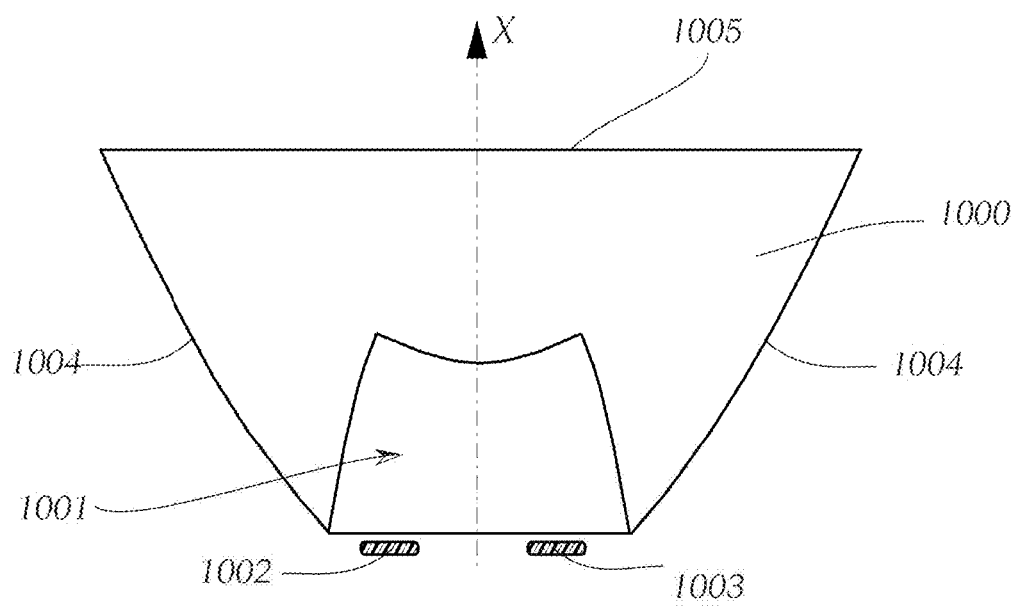

surface (100) is opposite the light sources (30, 40), and wherein the lateral coupling surface (200) adjoins the central light coupling surface (100) in such a way that a recess is formed in the optical element (2), in or opposite which the light sources (30, 40) are arranged and into which the light sources (30, 40) emit their light, wherein the two light sources (30, 40) lie on a straight line (G) which runs in a vertical direction (R), which runs parallel to a vertical axis (Z), and wherein the first light source, seen in the vertical direction (30), lies above the second light source (40), and wherein the light coupling region (10) has two focal points (F1, F2), wherein one of the light sources (30) is arranged in one of the focal points (F1) and the other light source (40) is arranged in the other focal point (F2), wherein the lateral coupling surface (200) of the light coupling region (10) is designed in such a way that, in a region which is at least partially or completely above a first horizontal plane (E1) in which the first light source (30) is arranged, in the vertical direction (R), the lateral boundary surface (200) has a first, curved lateral boundary surface portion (201), and in a region which in the vertical direction (R) lies at least partially or completely below a second horizontal plane (E2) in which the second light source (40) is arranged, the lateral boundary surface (200) has a second, curved lateral boundary surface portion (202), wherein the horizontal planes (E1, E2) are planes which run parallel to a plane (X, Y) to which the vertical axis (Z) is orthogonal and which contains the optical axis (X), and wherein the two lateral boundary surface portions (201, 202) are connected to one another via lateral boundary surface connecting portions (203, 204); and the central light coupling surface (10) is designed as follows: starting from each lateral boundary surface connecting portion (203, 204), a central coupling surface (103, 104) extends in the direction of the other lateral boundary surface connecting portion (204, 203), wherein the central coupling surfaces (103, 104) converge and terminate at a single central edge (110); above and below the central coupling surfaces (103, 104) extend two connection coupling surfaces (101, 102) which connect the central coupling surfaces (103, 104) to the lateral boundary surface portions (201, 202), wherein the central coupling surfaces (103, 104) are concavely curved in horizontal sectional planes—sectional planes which run parallel to a plane (X, Y) to which the vertical axis (Z) is orthogonal, and which contains the optical axis (X) —such that concave central coupling surface contours (103", 104") are produced.

25 Claims, 13 Drawing Sheets

(51) Int. Cl.
    F21S 41/141    (2018.01)
    F21S 43/241    (2018.01)
    F21S 41/32     (2018.01)
    F21S 43/31     (2018.01)

(56) References Cited

U.S. PATENT DOCUMENTS

| 2005/0152153 | A1* | 7/2005 | Amano | F21S 43/26 |
| | | | | 362/520 |
| 2008/0310159 | A1 | 12/2008 | Chinniah et al. | |
| 2009/0268455 | A1* | 10/2009 | Allegri | F21K 9/00 |
| | | | | 362/235 |
| 2014/0168963 | A1* | 6/2014 | Stone | F21S 8/08 |
| | | | | 362/231 |
| 2017/0144589 | A1* | 5/2017 | Jung | F21S 41/265 |
| 2018/0313519 | A1 | 11/2018 | Lacroix | |

* cited by examiner (A-A Section view)

($B_0$-$B_0$ Section view)

($B_1$-$B_1$ Section view)

ILLUMINATION DEVICE FOR A MOTOR VEHICLE HEADLIGHT, AND MOTOR VEHICLE HEADLIGHT

The invention a lighting device for a motor vehicle headlight and/or for a rear light of a motor vehicle and/or for a signal light for a motor vehicle, for generating at least two, in particular precisely two, light distributions, or for generating at least two, in particular precisely two, different lighting functions, wherein the lighting device comprises an optical element and two light sources—a first light source and a second light source, in particular LED light sources—wherein each of the light sources is controllable independently of the other light source or sources, wherein the optical element is formed from an optically transparent material, and wherein the optical element has a light coupling region and a light exit surface, and wherein light from the light sources, which is introduced into the optical element via the light coupling region, exits at least partially via the light exit surface, wherein the light coupling region is formed by a central light coupling surface and a lateral coupling surface on the side, wherein the central light coupling surface is opposite the light sources, and wherein the lateral coupling surface connects to the central light coupling surface in such a way that a recess is formed in the optical element, in or opposite which the light sources are arranged and into which the light sources emit their light, wherein the two light sources lie on a straight line which runs in a vertical direction, which runs parallel to a vertical axis, and wherein the first light source, seen in the vertical direction, lies above the second light source, and wherein the light coupling region has two focal points, wherein one of the light sources is arranged in one of the focal points and the other light source is arranged in the other focal point.

The invention further relates to such a lighting device, the lighting device being designed as a motor vehicle headlight or rear light of a motor vehicle or a signal light for a motor vehicle.

The invention also relates to a lighting system which is designed as a motor vehicle headlight or rear light of a motor vehicle or a signal light for a motor vehicle.

The invention also relates to a device comprising at least one lighting device and/or comprising at least one lighting system, the device being a motor vehicle headlight or a rear light for a motor vehicle or a signal light for a motor vehicle.

The above-mentioned optical elements are known in the form of so-called collimators. Such an optical element or collimator has reflective and refractive, that is to say light-refracting, surfaces. Such optical elements or collimators are often also referred to as TIR lenses (TIR: total internal reflection) or TIR optical elements. In addition to the term TIR optics (or TIR optical elements) for such an optical element (and the optical elements described below), the term CPC optics (or CPC optical elements) (compound parabolic concentrator) is also used, or the TIR optics are CPC optics, since, in addition to reflective, in particular totally reflective, outer surfaces bounding the optical element, the center region—i.e., the light coupling region—constitutes a classic, light-refracting lens boundary surface.

In the development of vehicle headlights, design is playing an increasingly important role. Due to the increasingly limited installation space, more compact optics are necessary to comply with the legally required illumination values. In particular, when a plurality of light sources, which are typically LEDs, are required to meet the legal requirements, solutions with conventional optical elements, as described above, quickly reach their limits.

For example, the practice is known from the prior art of using two or more optical elements to implement two (or more) different lighting functions or light distributions (or partial light distributions), each optical element having its own assigned light source. It is obvious that this leads to an increased installation space requirement; in addition, as a result of an inevitably necessary separate arrangement of the optical elements, the observer often experiences a nonhomogeneous light impression.

There are also arrangements in which two or more light sources are arranged in the light coupling region of the optical element. However, these solutions are often not optimal from an optical point of view, since the optical elements are only optimized for one light source.

It is an object to provide a solution to these problems.

This object is achieved with a lighting device described at the outset in that, according to the invention, the lateral coupling surface of the light coupling region (10) is designed in such a way that in a region which lies, in the vertical direction, at least partially or completely above a first horizontal plane in which the first light source is arranged, the lateral boundary surface has a first, curved lateral boundary surface portion, and in a region which lies at least partially or completely below a second horizontal plane, in the vertical direction, in which the second light source is arranged, the lateral boundary surface has a second, curved lateral boundary surface portion, wherein the horizontal planes are planes which run parallel to a plane to which the vertical axis is orthogonal, and which contains the optical axis, and wherein the two lateral boundary surface portions are connected to one another via lateral boundary surface connecting portions, and the central light coupling surface is designed as follows:

starting from each lateral boundary surface connecting portion, a central coupling surface extends in the direction of the other lateral boundary surface connecting portion, wherein the central coupling surfaces converge and terminate in a single central edge;

above and below the central coupling surfaces extend two connection coupling surfaces, which connect the central coupling surfaces to the lateral boundary surface portions, and wherein the central coupling surfaces are concavely curved in horizontal sectional planes—that is, sectional planes which run parallel to a plane to which the vertical axis is orthogonal, and which contains the optical axis—such that concave central coupling surface contours result.

The inventive design of the optical element makes it possible to realize a focal point in the light coupling region for each of the light sources in such a way that light originating from each of the light sources arranged in a focal point—assuming point light sources—is emitted into the far field in a point, for example (with appropriate alignment) in the so-called HV point, which results in a known manner as the intersection of the line H-H and the line V-V. The light distribution actually formed by each light source is produced as a result of the actual size of the given light source, with a maximum of the illuminance at the single point, for example at the point HV.

With the solution according to the invention, two spatially separate light sources, in particular LED light sources, can feed light into the optical element, and the light from each of the light sources illuminates in the far field—that is, on a measuring screen approximately 25 meters away from the lighting device—substantially the same illumination region, or the illumination regions of the two light sources are identical.

"Substantially the same illumination region" is understood to mean that the maximum region, i.e., the region of the maximum illuminance of the different light distributions, lies at the same points or the same region in the light image. The shapes of the light distributions themselves are preferably identical or very similar, but can differ from one another, for example in terms of color appearance.

The connection coupling surfaces are shaped in such a way that they each form a focal point for a light source, such that light coming from the light sources into the optical element is refracted into the single point, for example the point HV. The concavely curved central coupling surfaces as described, which spatially form, for example, cylindrical lenses, are shaped in such a way that for each of the light sources located at their focal point, the light rays that are emitted onto the central coupling surfaces are refracted at the point HV when they enter the optical element.

The lateral boundary surfaces adjoining the central light coupling surface refract light beams into reflective, in particular totally reflective outer surfaces of the optical element, and are preferably also directed by these into the single point, for example the point HV.

In the following, the relevant terms used will be defined first. The optical axis of the optical element or the projection optics device is denoted by X; this is approximately the primary direction of emission of the light from the optical element. "Z" defines a vertical axis that is orthogonal to the optical X axis. Another axis "Y," which is orthogonal to the other two axes, X, Z, runs transverse to the optical axis X.

The axes X, Z span a vertical plane; the axes X, Y span a horizontal plane.

When indications are made regarding the direction of light rays in the "vertical direction," this means the projection of these light rays into the X, Z plane. When indications are made regarding the direction of light rays in the "horizontal direction," this means the projection of these light rays into the X, Y plane.

In general, the terms "horizontal" and "vertical" are used for a simplified illustration of the relationships; in a typical installation situation in a motor vehicle, the axes and planes described can actually be horizontal and vertical. However, it can also be provided that the lighting device or, in the case of several lighting devices, one or more, in particular all lighting devices, are rotated with respect to this position, for example the X-axis can be inclined upward or downward with respect to a horizontal plane of the earth reference system, or the described X, Y, Z axis system can generally be rotated. A person skilled in the art thus understands that the terms used serve the purpose of a simplified description, and it is not necessary for an orientation to be accordingly in the earth reference system. The spatial alignment of a general vertical direction R, which runs parallel to the axis Z, follows this rotation in each case.

"First vertical sectional planes" are sectional planes which run parallel to a plane to which the optical axis X is orthogonal, and which contains the vertical axis Z (this plane is therefore spanned by the axes Y, Z).

"Second vertical sectional planes" are sectional planes that run parallel to a plane that is spanned by the optical axis X and the vertical axis Z.

"Horizontal sectional planes" are sectional planes that run parallel to a plane to which the vertical axis Z is orthogonal, and which contains the optical axis X (this plane is therefore spanned by the axes X, Y).

In particular, it is provided that the lateral boundary surface connecting portions have a straight connecting portion contour in first vertical sectional planes—that is, sectional planes that run parallel to a plane to which the optical axis is orthogonal, and which contains the vertical axis.

In addition, it can be provided that the lateral boundary surface connecting portions have a convex connecting portion contour in horizontal sectional planes—that is, sectional planes which run parallel to a plane to which the vertical axis is orthogonal, and which contains the optical axis.

Furthermore, it can be provided that the lateral boundary surface portions have a concavely curved lateral boundary surface portion contour in first vertical sectional planes—that is, sectional planes which run parallel to a plane to which the optical axis is orthogonal, and which contains the vertical axis.

The lateral boundary surface portions are preferably convexly curved. In vertical sections, the lateral boundary surface portions (or the contour resulting in these sections) are thus preferably concave, but the surface itself is preferably convex in space.

For example, the different surfaces described are smooth.

Furthermore, it is preferably provided that the central coupling surfaces are straight in the vertical direction, such that straight central coupling surface contours are produced in second vertical sectional planes—that is, sectional planes that run parallel to a plane spanned by the optical axis and the vertical axis—and the central coupling surface contours preferably run parallel to the single central edge.

The central coupling surfaces are designed accordingly as cylindrical lenses, with the height of the cylinder parallel to the vertical axis, and thus with the refraction behavior corresponding to a cylindrical lens.

In addition, it is preferably provided that each of the connection coupling surfaces is divided into two partial connection coupling surfaces by a connecting edge.

In particular, the connecting edges, viewed in the vertical direction, run in the same direction as the central edge.

For example, the connecting edges are designed to be concavely curved in the second vertical sectional planes.

In this case, each of the partial connection coupling surfaces can be designed with a concave curve.

The light coupling region and/or the optical element are particularly preferably symmetrical with respect to a plane which is spanned by the optical axis and a horizontal axis, and/or with respect to the vertical sectional plane which is spanned by the optical axis and the vertical axis.

In particular, the optical axis of the optical element runs symmetrically between the light sources.

In this way, two illumination regions or light distributions that are as identical as possible can be generated with the two light sources.

Furthermore, it can be provided that the central edge adjoins a connecting edge in a connection point, and one focal point preferably lies on a straight line of focal points, a straight line of focal points running through a connection point and parallel to the optical axis.

It can be provided that the first focal point has the same distance from its connection point as the distance of the second focal point from its connection point.

For example, the light coupling region is connected to the light exit surface via a shell surface.

In this case, the shell surface is advantageously designed to be straight in the vertical direction in regions adjoining the lateral boundary surface connecting portions.

Viewed spatially, these lateral boundary surfaces and the shell surface are generally curved outward. Light that propagates in the optical element and strikes this shell surface is preferably reflected, in particular totally reflected, and preferably directed to the point HV. The resulting bundle of light, in particular a bundle of parallel light rays, thus preferably propagates like the light rays that are refracted in the central region of the light coupling region.

In particular, it is provided that the light sources each include at least one light-emitting diode or consist of one light-emitting diode.

Each light source preferably has a primary emission direction, and in particular it is provided that the primary emission directions of the light sources run parallel to the optical axis of the optical element. For example, the primary emission direction of each light source, in particular an LED, is parallel to and, in particular, coincident with the respective straight lines of the focal point.

Furthermore, the object set out at the outset is achieved with a lighting system which comprises a lighting device described above, and which comprises a light guide element into which light from the optical element of the lighting device can be coupled, and said light can emerge from the light guide element via a light guide optics exit surface to form one, two or more light distributions.

It is preferably provided that the light guide optics exit surface has cylindrical lenses which preferably run in the direction of a vertical axis of the light guide element.

It can be provided that an optical axis of the light guide element and the optical axis of the optical element of the lighting device do not coincide and, in particular, are rotated with respect to one another by an angle.

In addition, it can be provided that, viewed in a projection in a vertical plane, the vertical axis of the optical element and the vertical axis of the light guide element run parallel or not parallel to one another.

The invention also relates to a motor vehicle headlight which comprises at least one lighting device described above and/or at least one lighting system described above.

With the invention, two light distributions can be generated with one optical element using two light sources, which light distributions are substantially identical or have substantially identical illumination regions. Whether the light distributions or just the illumination regions are substantially identical also depends on the light sources used.

In the case of light-emitting diodes of the same type with different colors (e.g. white and yellow), for example, the emission characteristics of the light-emitting diodes are identical, such that substantially identical illumination regions result with the optical element according to the invention, and the measured values (e.g. illuminance) are substantially identical. The light distributions are thus identical, but the generated light images differ in terms of color.

In the case of LEDs of the same type and of identical color, substantially identical light distributions (same illumination region, same measured values, same color) are generated, which also match in terms of their color, such that the light images are also identical.

When two light-emitting diodes of different brightness are used, the illumination regions are substantially identical, but the measured values of the light distributions scale with the strength of the LEDs, such that the light distributions are not identical in this case.

Figure 2:
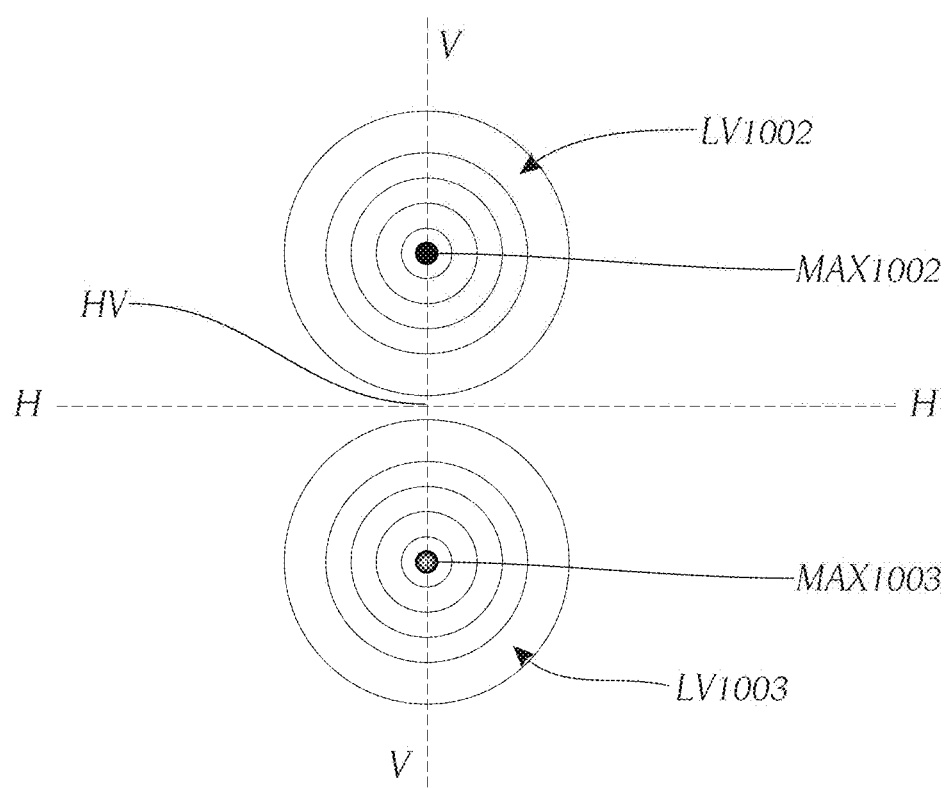
Figure 3:
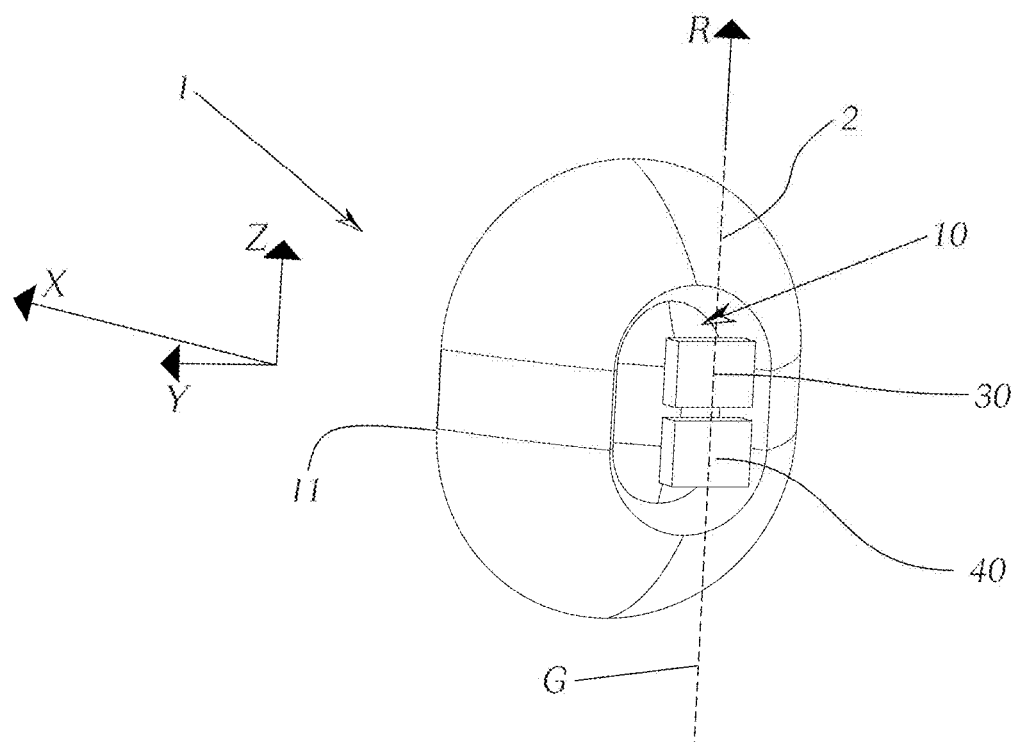
Figure 4:
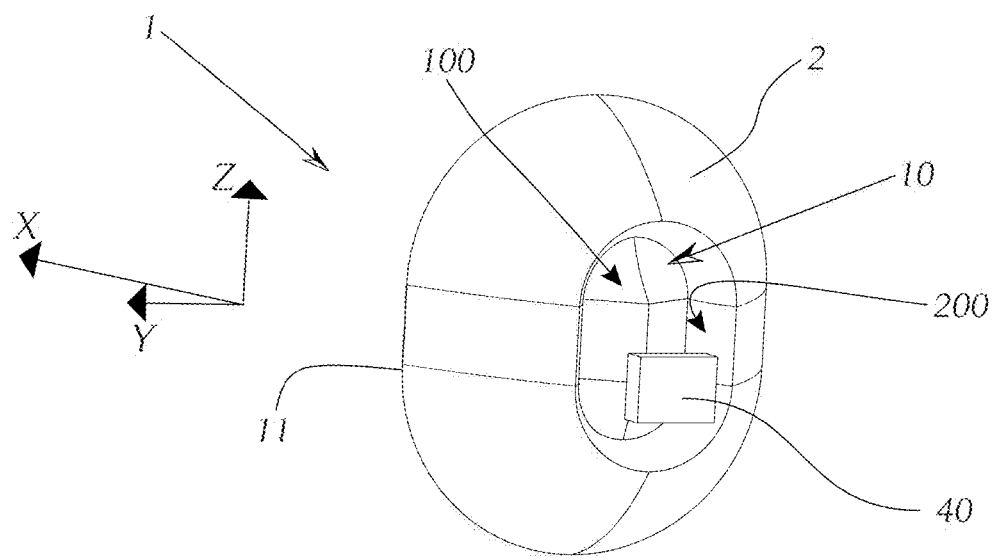
Figure 5:
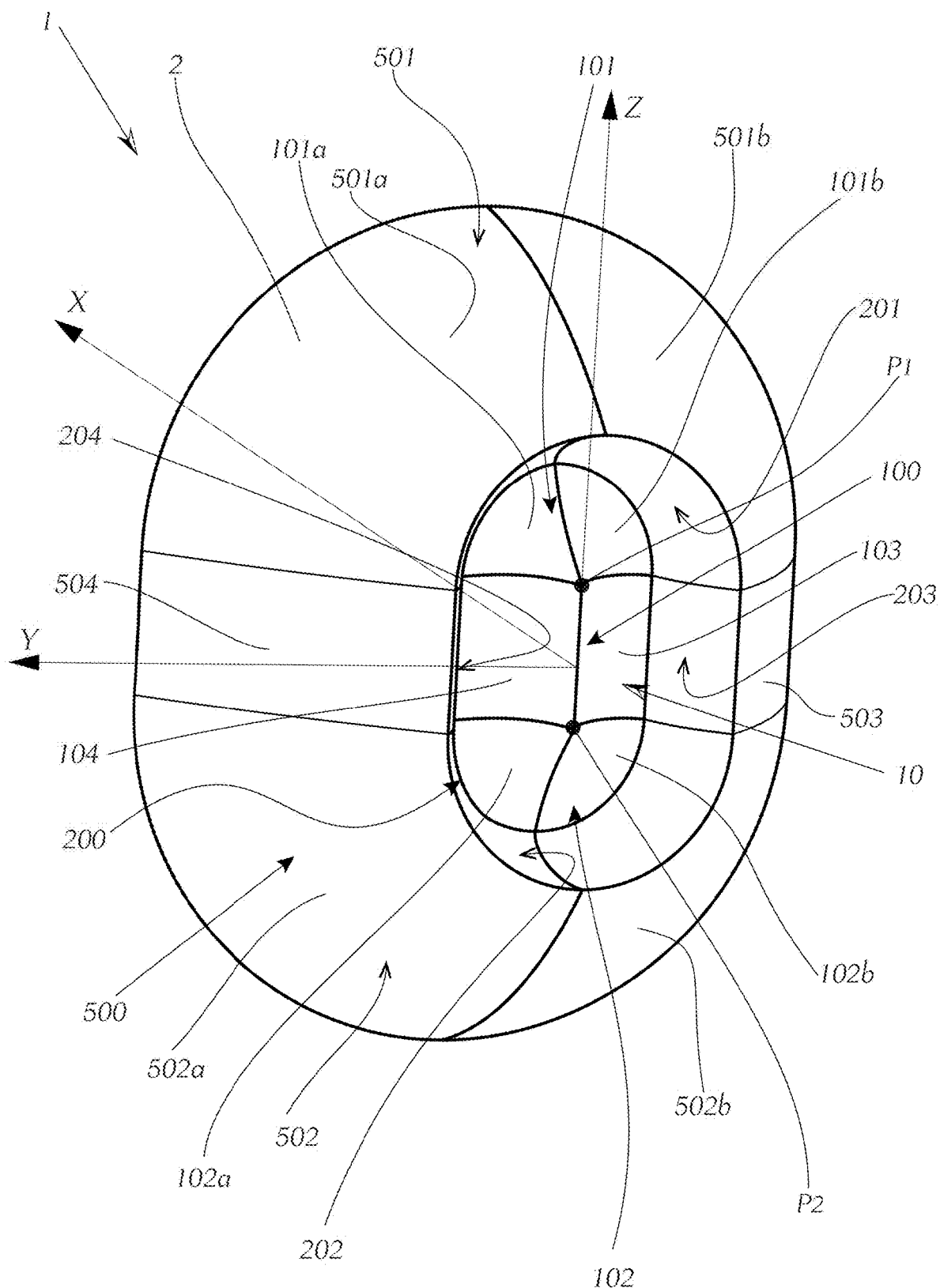
Figure 6:
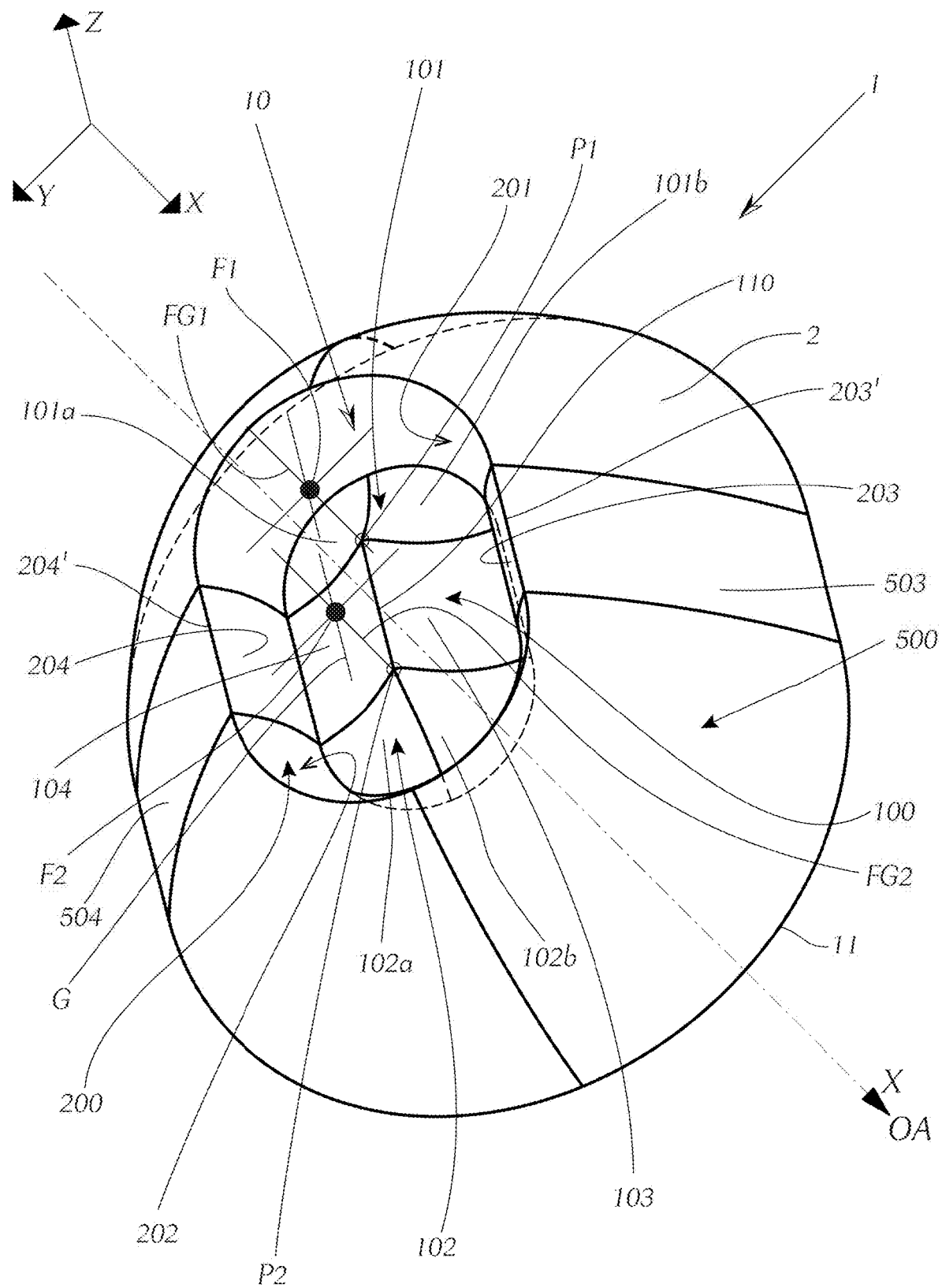
Figure 7:
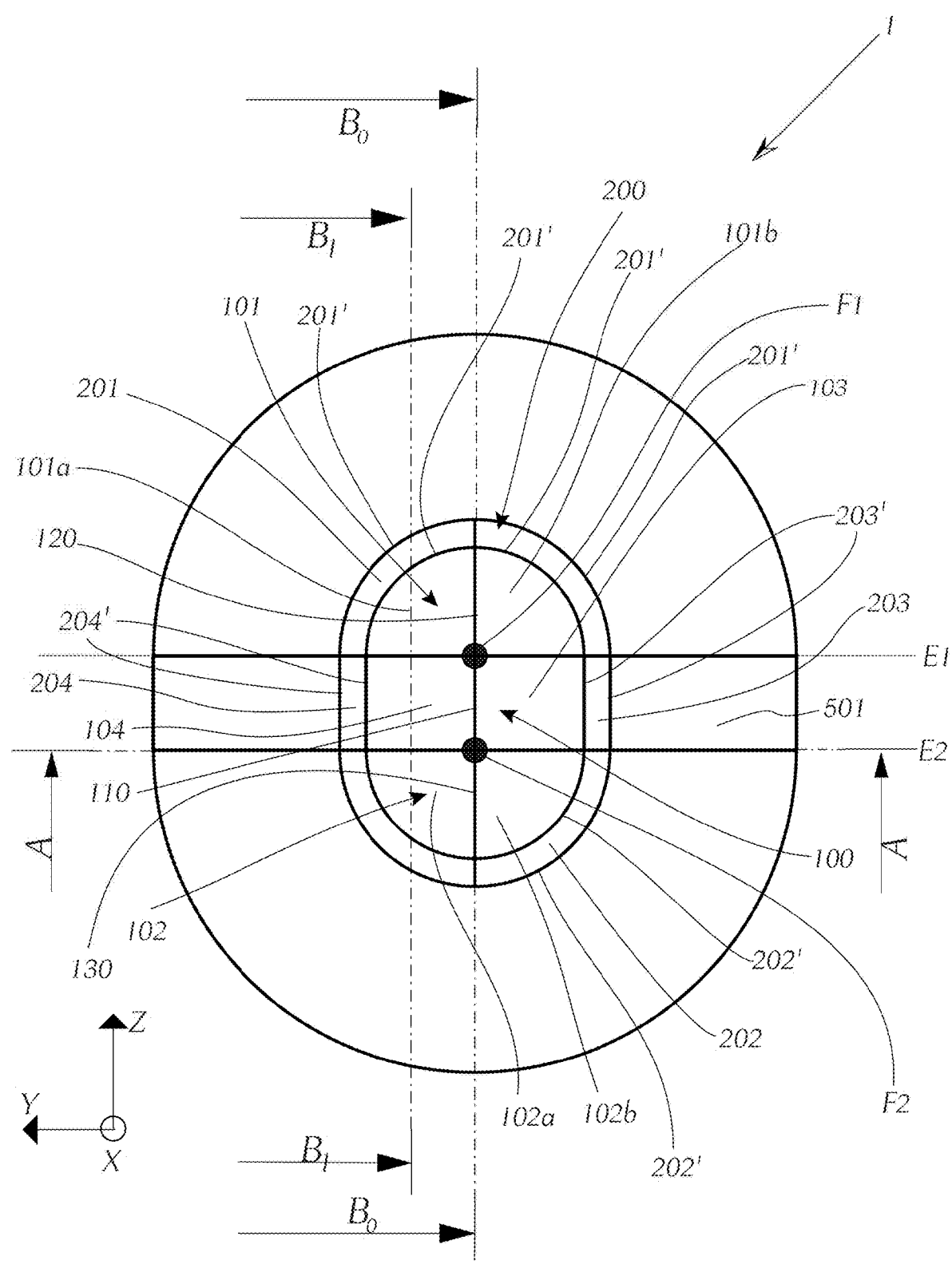
Figure 8:
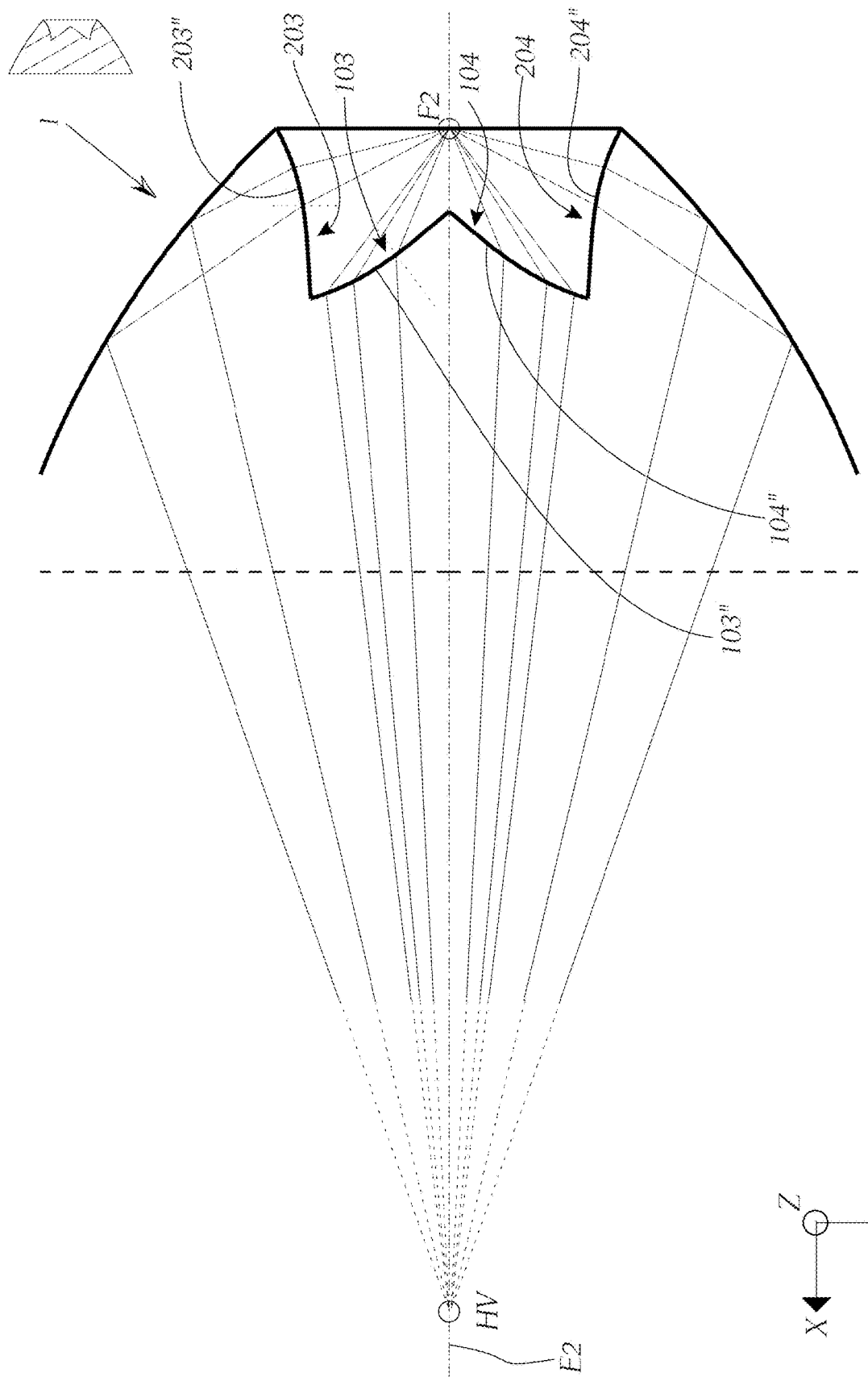
Figure 9:
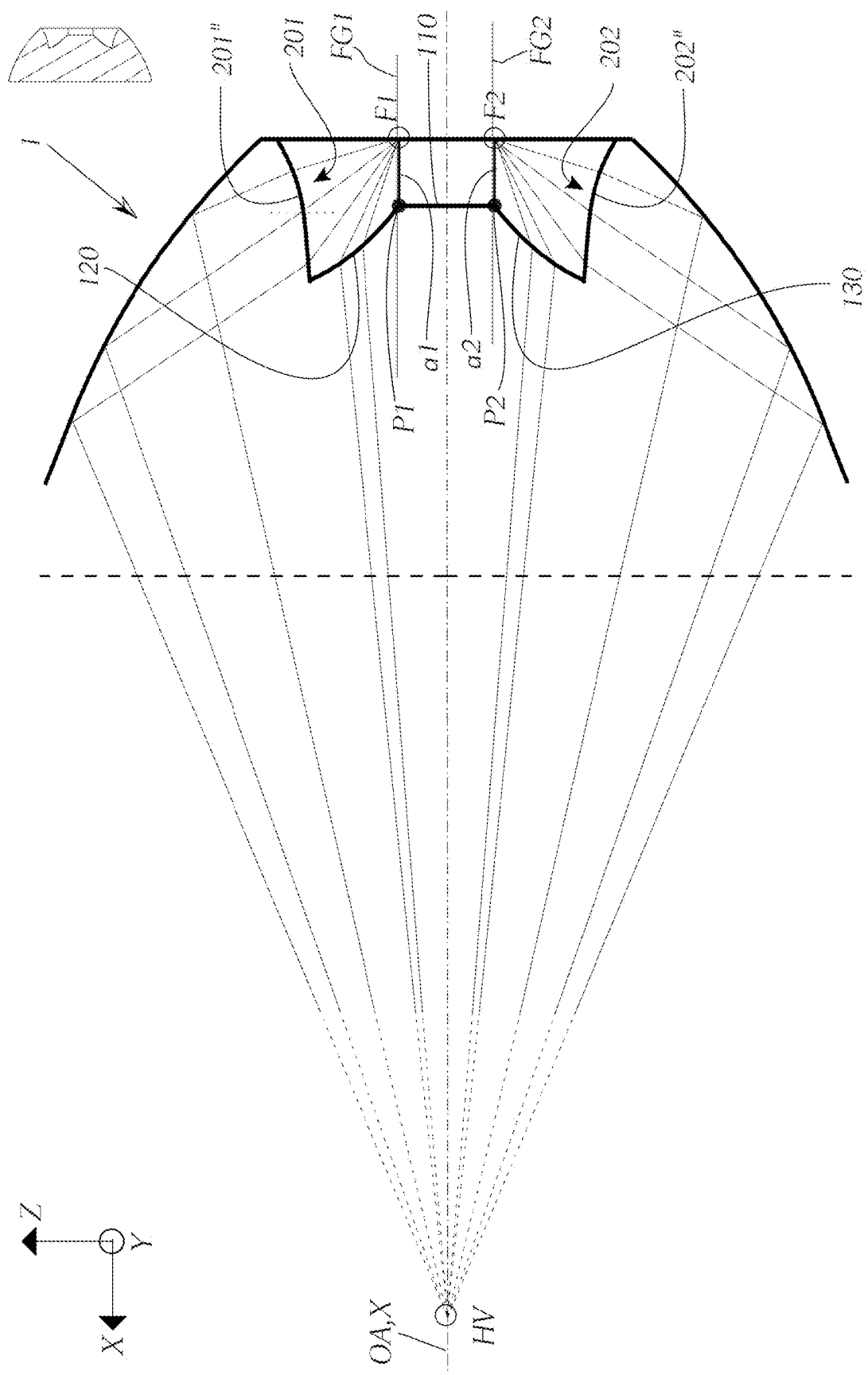
Figure 10:
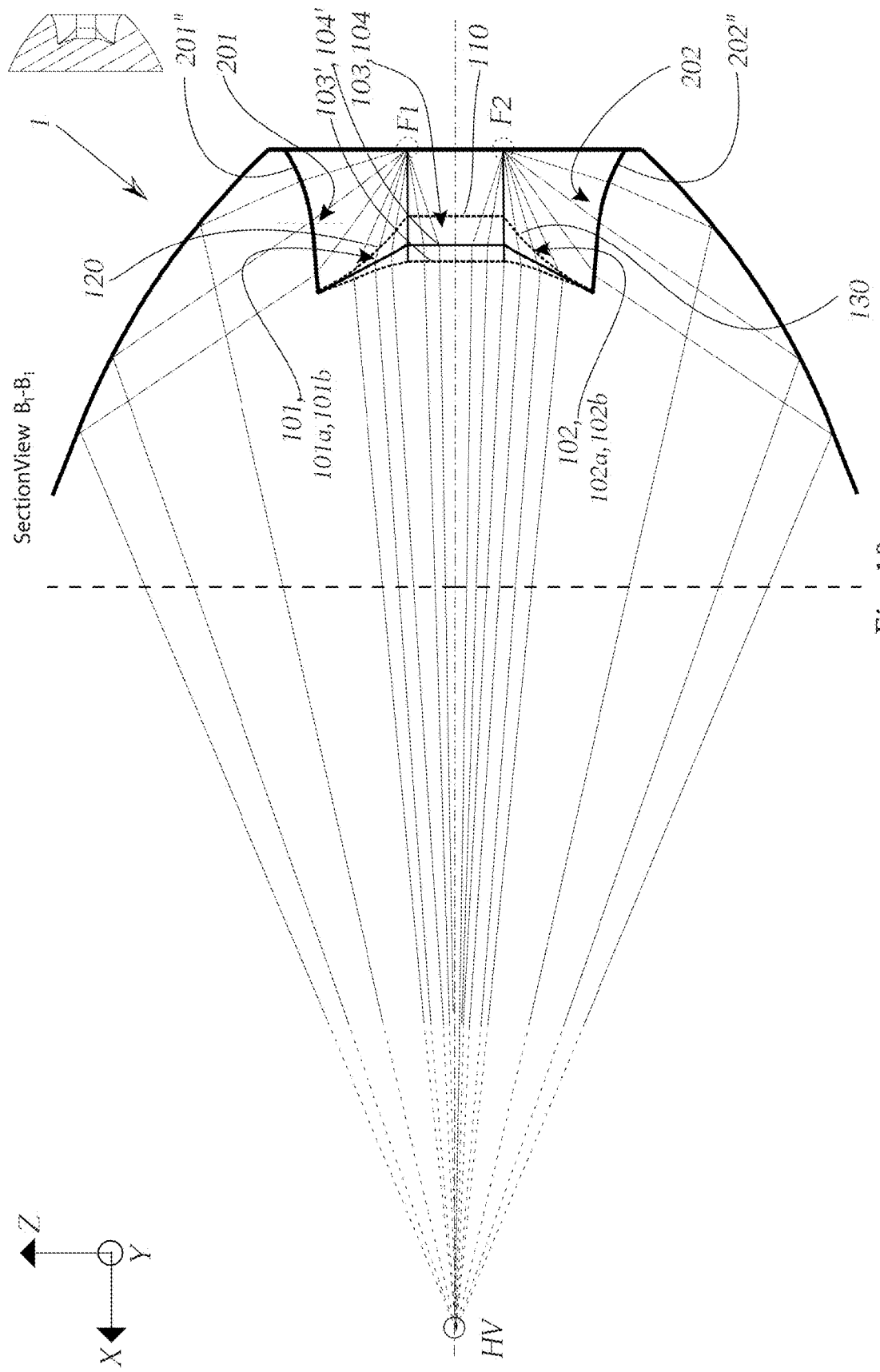
Figure 11:
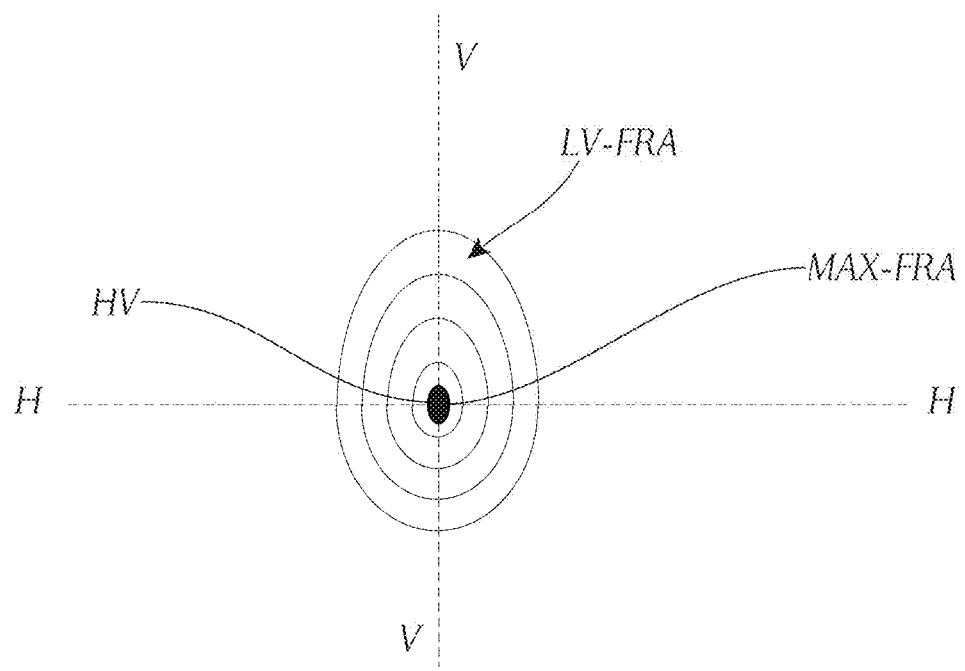
Figure 12:
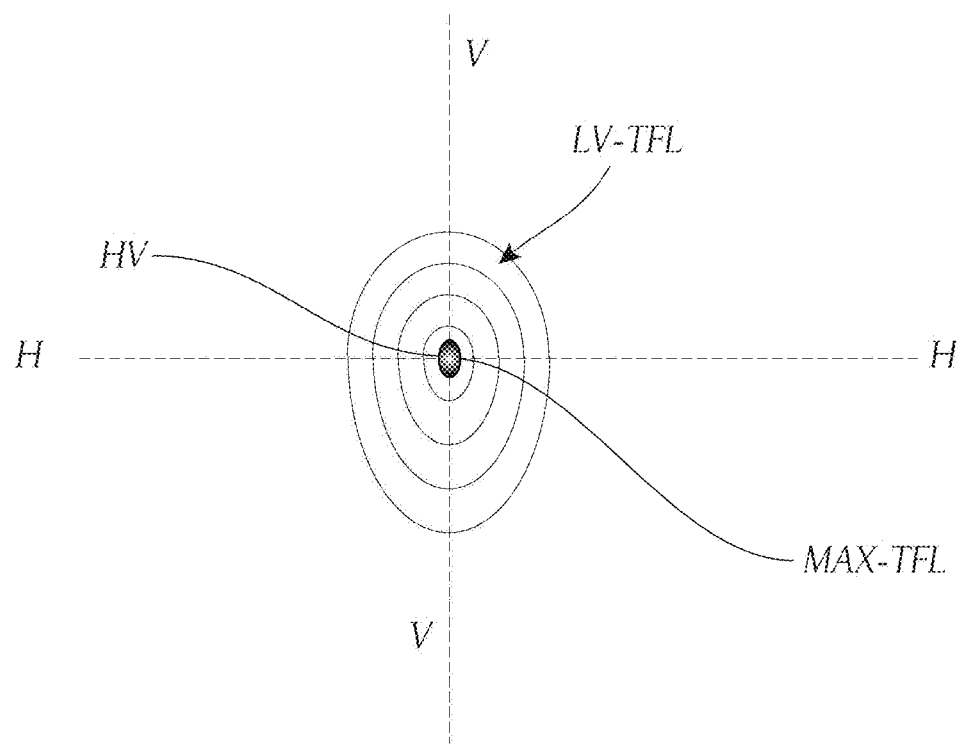
Figure 13:
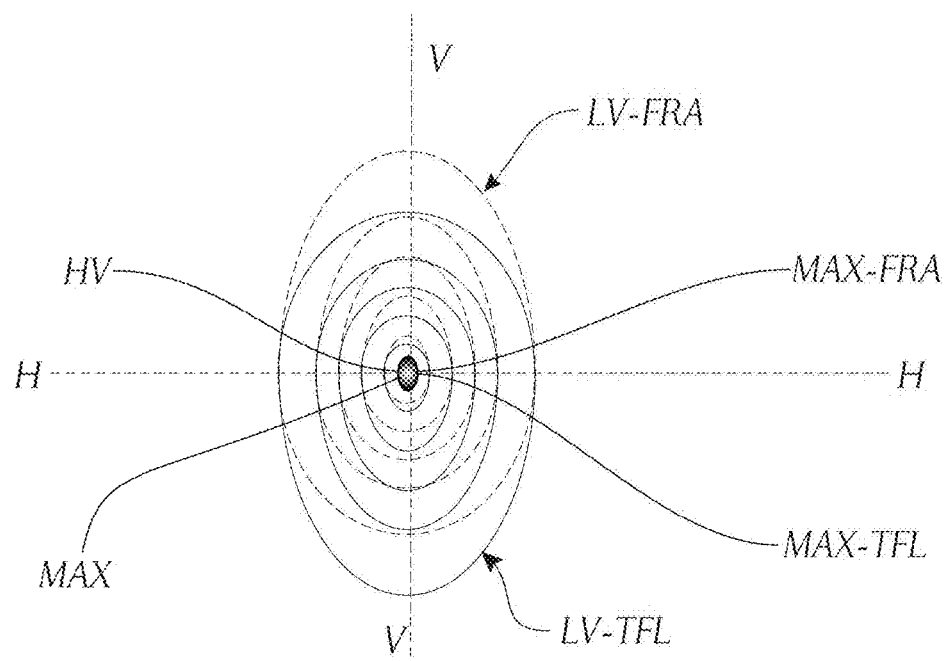
Figure 14:
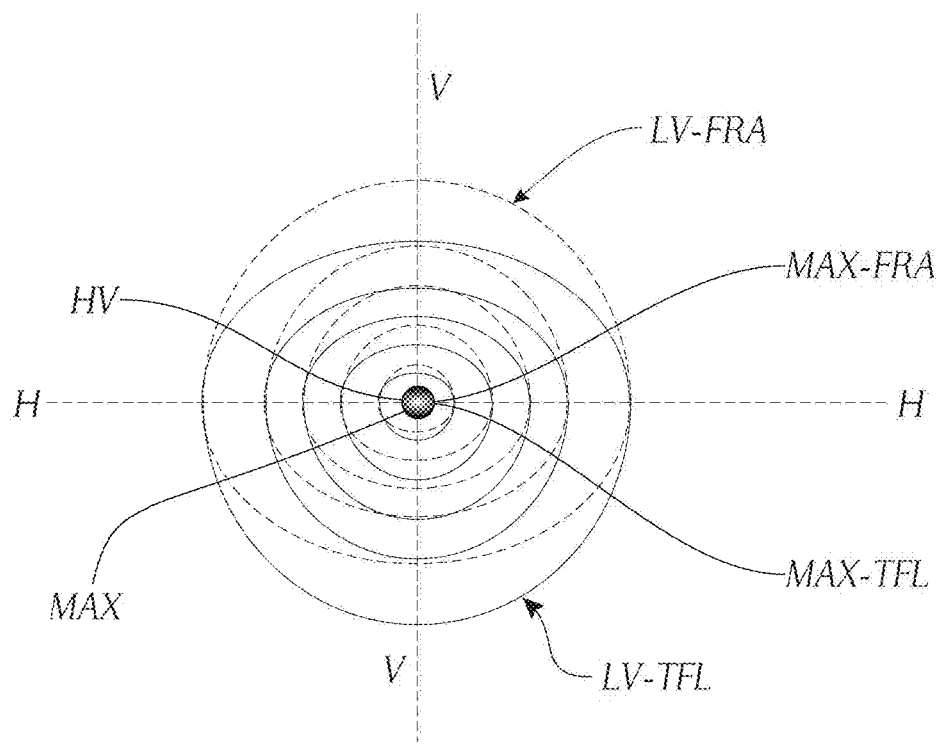
Figure 15:
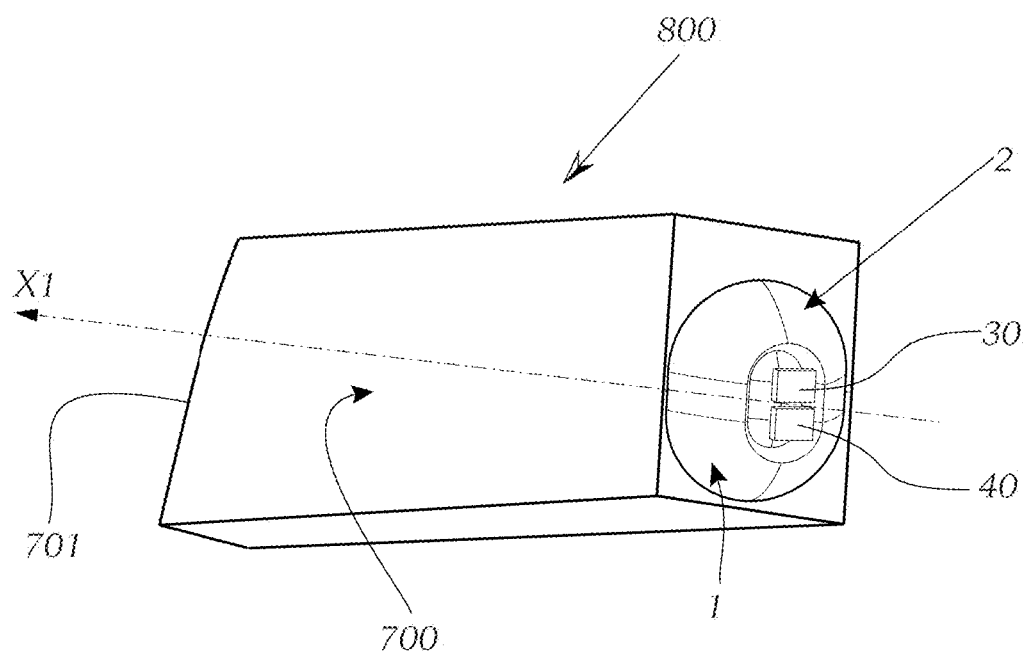
Figure 16:
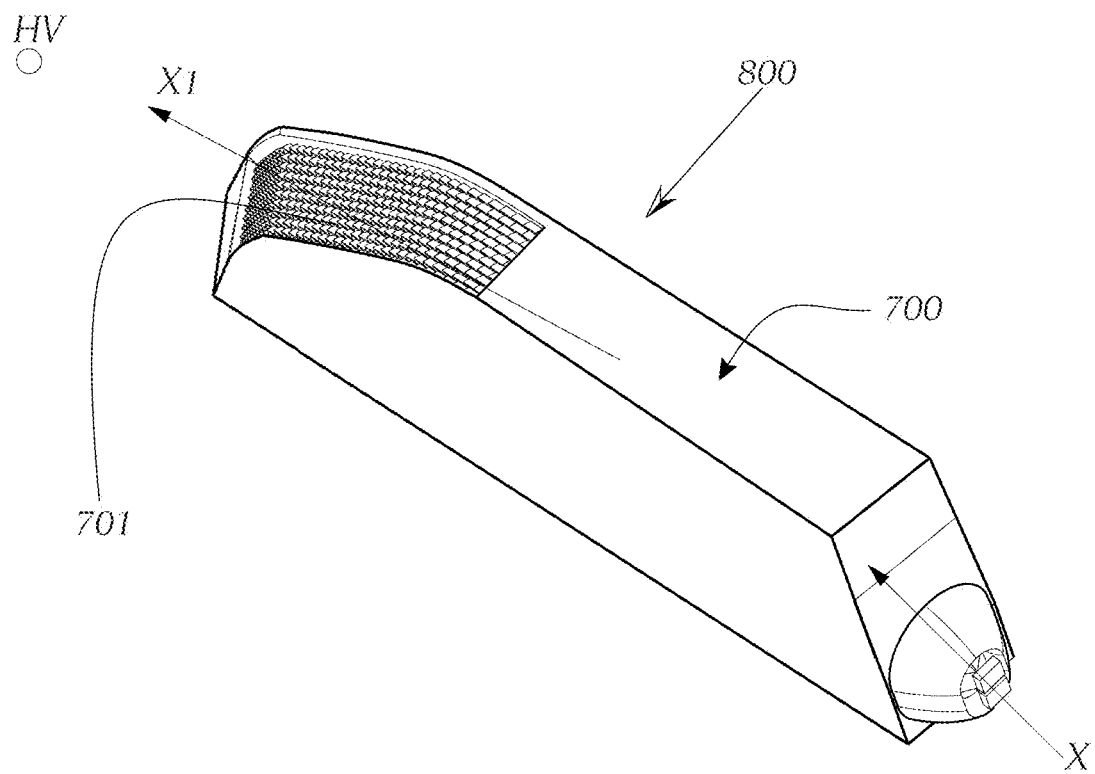
Figure 17:
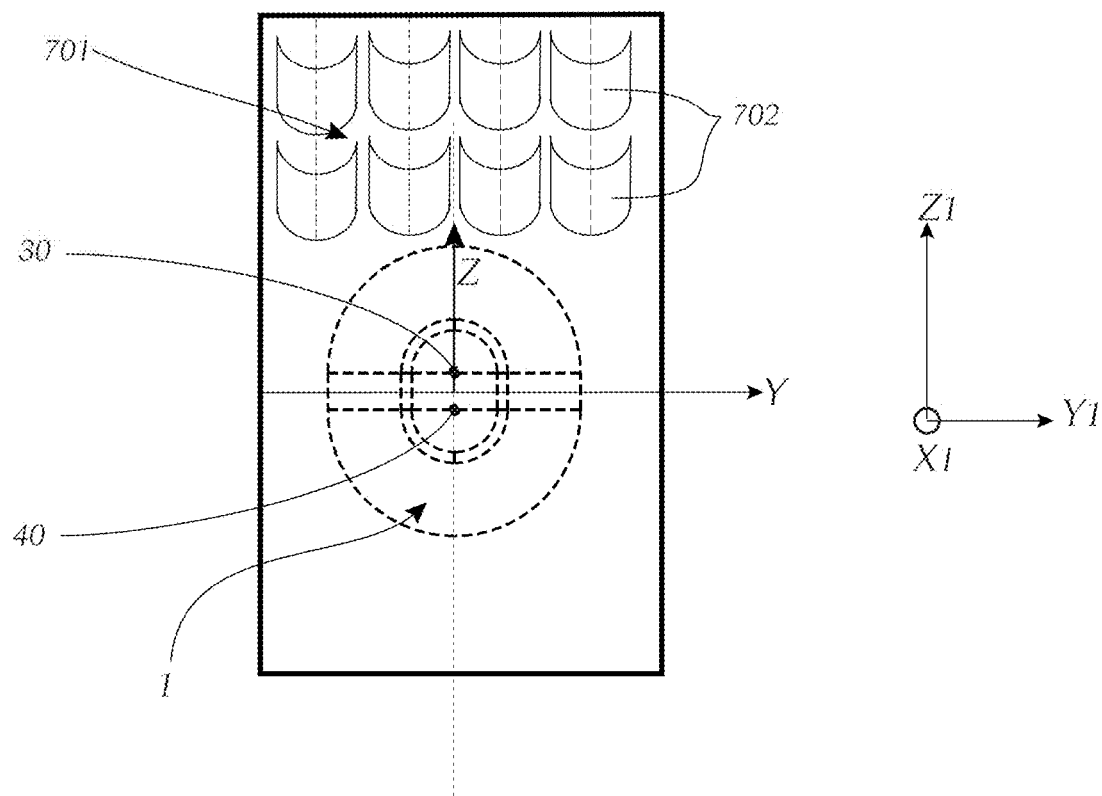
Figure 18:
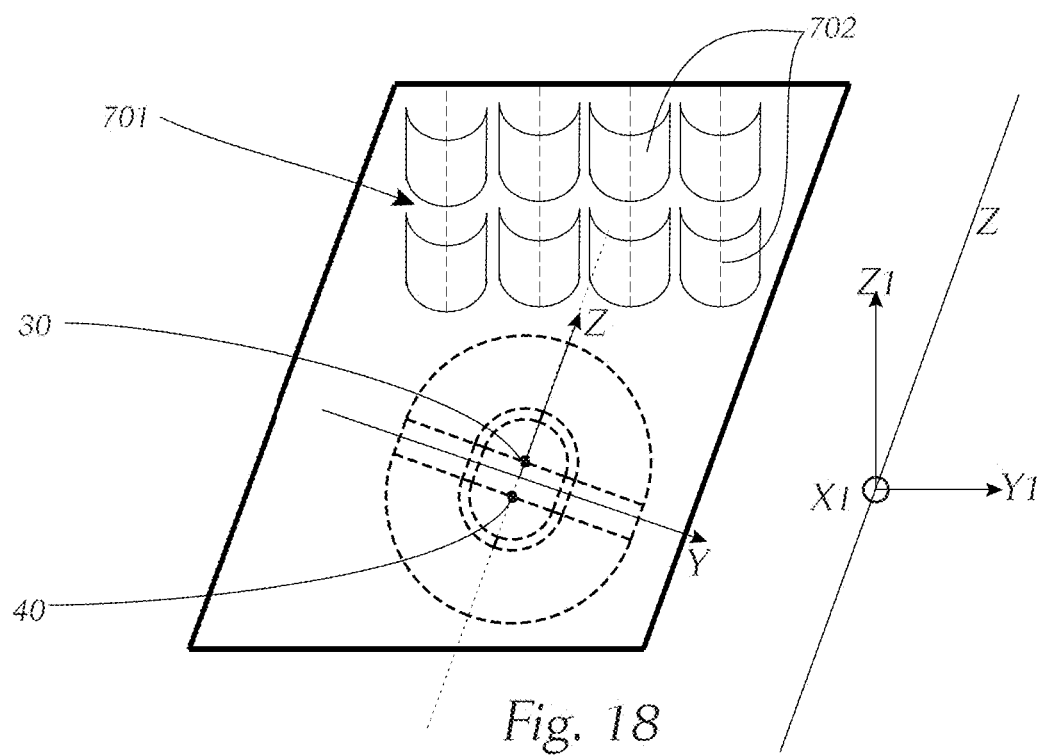
Figure 19:
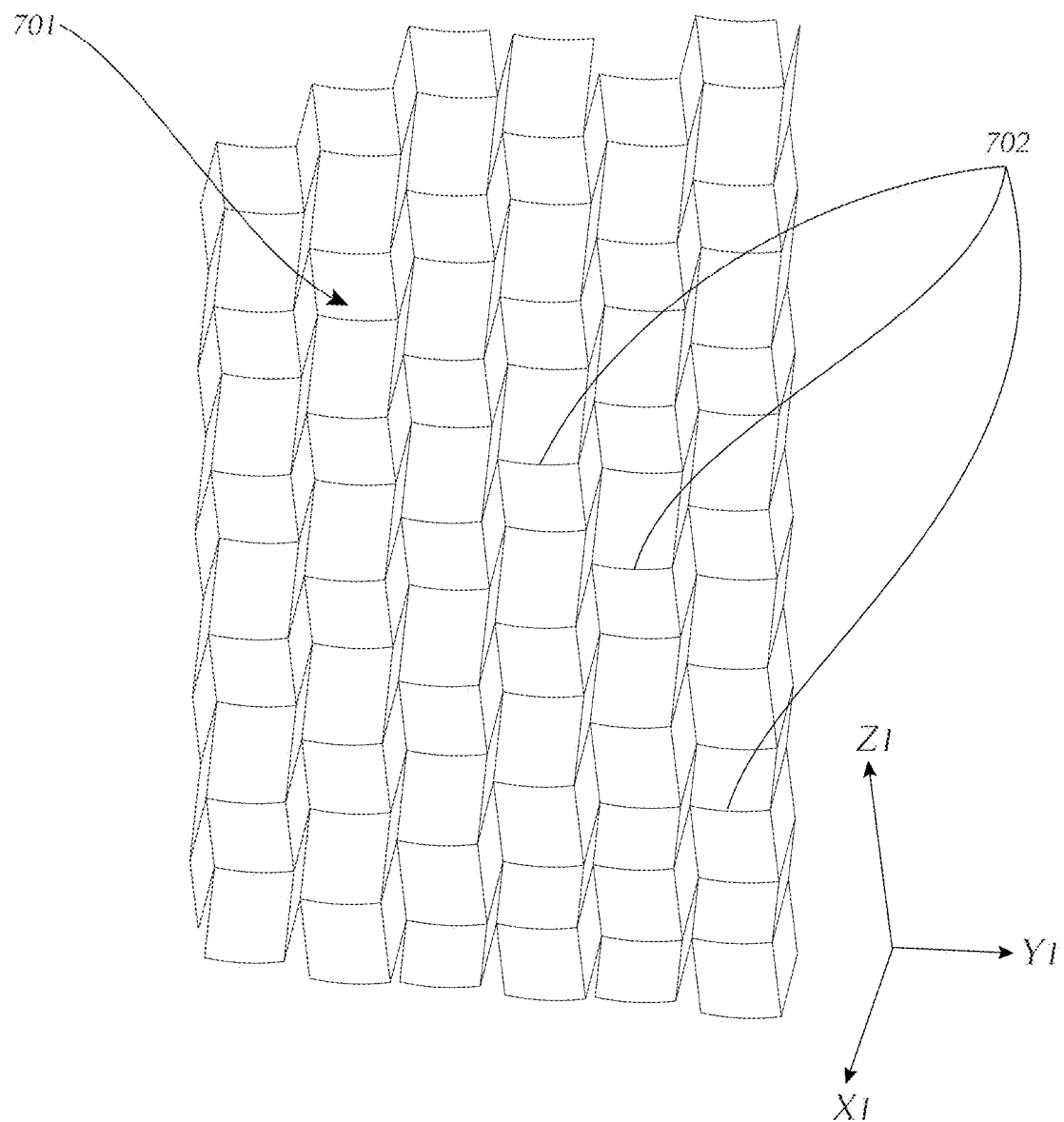

The invention is explained in more detail below with reference to the drawing. In the drawing:

FIG. 1 is a lighting device having an optical element, in particular a collimator, according to the prior art, with two light sources, FIG. 2 is two light distributions generated with the optical element of FIG. 1, FIG. 3 is a lighting device according to the invention, in a perspective view from the rear, FIG. 4 is the lighting device of FIG. 3, with a light source "removed" for an improved view of the light coupling region, FIG. 5 is the lighting device of FIG. 3, without light sources, in a detailed illustration, FIG. 6 is the lighting device once again, viewed from a different direction, FIG. 7 is a rear view of the lighting device and a projection of various first vertical sectional planes into a common first vertical plane, FIG. 8 is a section along the line A-A of FIG. 7, FIG. 9 is a section along the line $B_0$-$B_0$ of FIG. 7, FIG. 10 is a section along the line $B_1$-$B_1$ of FIG. 7, FIG. 11 is a schematic depiction of a first light distribution of a first light source generated with a lighting device according to the invention, FIG. 12 is a schematic depiction of a second light distribution of a second light source generated with a lighting device according to the invention, FIG. 13 is a schematic depiction of a superimposition of the first and second light distribution of FIGS. 11 and 12, FIG. 14 is a schematic depiction of a superimposition of the first and second light distribution of FIGS. 11 and 12, after passing through a light exit surface with an optical structure, for example in the form of cylindrical lenses, FIG. 15 is a lighting system having a lighting device according to the invention, with light guide optics connected upstream in the light exit direction, FIG. 16 is the lighting system of FIG. 15, in a different perspective view, FIG. 17 is the lighting system of FIGS. 15 and 16, in a projection of the light guide optics exit surface of the light guide optics and of the optical element of the lighting device into a vertical plane, FIG. 17 is the lighting system of FIGS. 15 and 16, in a projection of the light guide optics exit surface of the light guide optics and of the optical element of the lighting device into a vertical plane, FIG. 18 is a further lighting system, in a projection of the light guide optics exit surface of the light guide optics and of the optical element of the lighting device into a vertical plane, and FIG. 19 is the light guide optics exit surface in a perspective view.

FIG. 1 shows an optical element which is known from the prior art, and which is rotationally symmetrical about an optical axis X, in particular an optical element 1000. The optical element 1000 is a solid body made of an optically transparent material. Two LED light sources 1002, 1003 are located in a light coupling region 1001 of the optical element 1000.

In general, the wording "light source/focal point in a light coupling region" means that the light source/focal point is actually arranged within the recess that the light coupling region forms in the optical element, but it can also be provided that the light source/focal point lie (slightly) outside the recess, the light emerging from the light sources.

The light emitted by the light sources 1002, 1003 enters the optical element 1000 via the light coupling region 1001, is refracted, and is propagated therein directly, or after reflection on the lateral surfaces 1004 of the optical element 1000—which are in particular totally reflective—and exits via a light exit surface 1005.

In the case of such an optical element 1000, a focal point of the light coupling region 1001 is typically on the optical axis X, such that these two light sources 1002, 1003 are not in the focal point. Correspondingly, as schematically shown in FIG. 2, the two light sources 1002, 1003 illuminate different regions and form different light distributions LV1002, LV1003, with non-coincident regions MAX1002, MAX1003 of maximum illuminance.

In the following, a lighting device according to the invention is explained in more detail with reference to FIG. 3-10, with which the disadvantages of the prior art can be alleviated or eliminated. It is assumed in the following that the lighting device is oriented per se in such a way that it generates the light images shown in the subsequent photos and described in the text. In principle, the lighting device itself can also be oriented differently (and then directs its light into a point other than the point HV described below); this situation is discussed in more detail below, beginning with FIG. 15.

FIGS. 3 and 4 generally show the lighting device 1 according to the invention for a motor vehicle headlight, for generating two light distributions, having an optical element 2 and two light sources 30, 40. The coordinate system used was already discussed at the outset and will not be described in more detail here.

The light sources 30, 40 are preferably light-emitting diodes (LEDs); in particular they have a flat light-emitting surface. The primary emission directions of the light sources, in particular the normal vectors to the light emission surfaces of the LEDs, are preferably parallel to one another and to the optical axis X of the optical element 2.

The optical element 2 is formed from an optically transparent material, and has a light coupling region 10 and a light exit surface 11. Light from the light sources 30, 40, which is introduced into the optical element 2 via the light coupling region 10, emerges at least partially, preferably completely, via the light exit surface 11.

The light coupling region 10 is formed from a central light coupling surface 100 and a lateral coupling surface 200 on the side, the central light coupling surface 100 being directly opposite the light sources 30, 40, such that the normal vector of the light sources 30, 40 penetrates the central light coupling surface 100.

The lateral coupling surface 200 adjoins the central light coupling surface 100 in such a way that a recess is formed in the optical element 2, in or opposite which the light sources 30, 40 are arranged and into which the light sources 30, 40 emit their light.

The two light sources 30, 40 on a common straight line G, which runs in a vertical direction R, which runs parallel to the vertical axis Z. Viewed in the vertical direction, the first light source 30 lies above the second light source 40.

The light coupling region 10 has two focal points F1, F2 (or forms these), one of the light sources 30 being arranged in one of the focal points F1 (first focal point) and the other light source 40 being arranged in the other focal point F2 (second focal point). The focal points F1, F2 can lie inside the recess or outside it.

For example, the practice is known from the prior art of using two or more optical elements to implement two (or more) different lighting functions or light distributions (or partial light distributions), each optical element having its own assigned light source. It is evident that this leads to an increased installation space requirement; in addition, inhomogeneities are often produced as a result of the necessarily separate arrangement of the optical elements.

The optical element 2 now has the following structure:

The lateral coupling surfaces 200 of the light coupling region 10 are designed in such a way that, in a region which lies at least partially or completely above a first horizontal plane E1 in which the first light source 30 is arranged, in the vertical direction R, the lateral boundary surface 200 has a first, curved lateral boundary surface portion 201, and in a region which lies at least partially or completely below a second horizontal plane E2, in the vertical direction R, in which the second light source 40 is arranged, the lateral boundary surface 200 has a second, curved lateral boundary surface portion 202.

The terms "above" and "below" can be found in the coordinate system described at the outset. In the case of an actually rotated arrangement of the lighting device, as also mentioned at the outset, the top and bottom can of course also lie on the side, or be flipped.

The horizontal planes E1, E2 are planes which run parallel to the X, Y plane, to which the vertical axis Z is orthogonal.

The two lateral boundary surface portions 201, 202 are connected to one another via lateral boundary surface connecting portions 203, 204.

The central light coupling surface 10 is designed as follows: starting from each lateral boundary surface connecting portion 203, 204, a central coupling surface 103, 104 extends in the direction of the other lateral boundary surface connecting portion 204, 203, with the central coupling surfaces 103, 104 converging and terminating at the same central edge 110. Above and below the central coupling surfaces 103, 104 extend two connection coupling surfaces 101, 102, which connect the central coupling surfaces 103, 104 with the lateral boundary surface portions 201, 202.

The central coupling surfaces 103, 104 are concavely curved in horizontal sectional planes—that is, sectional planes that run parallel to the X, Y plane to which the vertical axis Z is orthogonal—such that concave central coupling surface contours 103'', 104'' result; see FIG. 8. (The point of view is, for example, a region around a focal point, for example focal point F2 in FIG. 8.)

The connection coupling surfaces 101, 102 are shaped in such a way that they each form a focal point for a light source, such that light coming from the light sources 30, 40 into the optical element 2 is refracted in the image into a single point, e.g. the point HV, with the preferred assumption of a planar light exit surface 11 to which the optical axis X is orthogonal. The light exit surface can, however, also be curved, and then acts as a further lens boundary surface that shapes the light distribution; this also applies to the most general context and scope of the present invention and is not restricted to the embodiment described in the figures. The central coupling surfaces 103, 104, concavely curved as described, which spatially form, for example, cylindrical lenses, are shaped in such a way that for each of the light sources located at their focal point, the light rays thereof, which are radiated onto the central coupling surfaces, are refracted at the point HV when they enter the optical element.

With regard to the terms "concave" and "convex," for example, the following should be noted: when viewing a section through a body in a sectional plane, we refer to an intersection curve delimiting the body in this sectional plane as concave if the line connecting the two end points of the intersection curve lies outside the body; if the connecting line runs inside the optical element, the intersection curve is convex.

The same applies in space—if a planar connecting surface of points on a surface in question lies outside the body, the surface in question is concave, if the planar connecting surface is inside the body, the surface in question is convex.

The lateral boundary surfaces adjoining the central light coupling surface refract light rays toward reflective, in particular totally reflective, outer surfaces 501a, 501b, 502a, 502b, 503, 504, i.e., to the shell surface 500 of the optical element, and are preferably also directed by these to the single point, e.g. point HV. These outer surfaces forming the shell 500 are correspondingly shaped.

The lateral boundary surface connecting portions 203, 204 have a straight connecting portion contour 203', 204' in the first vertical sectional planes; see FIG. 7.

In horizontal sectional planes, the lateral boundary surface connecting portions 203, 204 have convex connecting portion contours 203", 204"; see, for example, FIG. 8.

In the first vertical sectional planes, the lateral boundary surface portions 201, 202 have a concavely curved lateral boundary surface portion contour 201', 202', as can be seen in FIG. 7.

The lateral boundary surface portions 201, 202 are convexly curved; see, for example, the convex contours 201", 202" of FIG. 9. In vertical sections (FIG. 7), the lateral boundary surface portions (or the contour resulting in these sections) are thus concave, but their surface itself is convex in space.

In spatial terms, the surfaces 201, 202 are therefore curved outward, that is to say toward the respective light sources—and are therefore convex.

Preferably, all of the previously described and yet to be described surfaces, at least in the light coupling region, are smooth. Such an advantageous embodiment defines a surface normal at each point of the light coupling region, such that light refraction takes place according to Snell's law of refraction as a function of the refractive index of the transparent material.

The central coupling surfaces 103, 104 are straight in the vertical direction Z, R, such that straight central coupling surface contours 103', 104' result in the second vertical sectional planes, which preferably run parallel to the single central edge 110 (see FIG. 10). The central coupling surfaces 103, 104 are designed accordingly as cylindrical lenses, wherein the height of the cylinder is parallel to the vertical axis Z, and therefore the refraction behavior corresponds to a cylindrical lens.

Each of the connection coupling surfaces 101, 102 is divided into two partial connection coupling surfaces 101a, 101b, 102a, 102b by a connecting edge 120, 130. In particular, connecting edges 120, 130, viewed in the vertical direction, run in the same direction as the central edge 110, i.e., the central edge 110 runs in the vertical direction R, i.e., parallel to the Z-axis (see FIG. 7).

The connecting edges 120, 130 are formed so as to be concavely curved in the second vertical sectional planes. Each of the partial connection coupling surfaces 101a, 101b, 102a, 102b can be concavely curved so that, as FIG. 10 shows, the partial connection coupling surfaces 101a, 101b, 102a, 102b arch away from the respective focal points.

As can be seen from the figures, the light coupling region 10 and, in particular, that of the optical element 2, are symmetrical with respect to the X, Y plane and with respect to the X, Z plane. The optical axis X of the optical element 2 runs symmetrically between the light sources.

In this way, two illumination regions or light distributions that are as identical as possible can be generated with the two light sources.

The central edge 110 adjoins one connecting edge 120, 130 at each of the connection points P1, P2, wherein one focal point F1, F2 lies on each of the focal lines FG1, FG2 (FIG. 6), and each focal line FG1, FG2 passes through a connection point P1, P2 and runs parallel to the optical axis X. The distance a1 of the first focal point F1 from its connection point P1 is the same as the distance a2 of the second focal point F2 from its connection point P2.

As already described above, the light coupling region 10 of the optical element 2 is connected to the light exit surface 11 via a shell surface 500. In this case, the shell surface 500 is straight, in the vertical direction R, in regions 503, 504 adjoining the lateral boundary surface connecting portions 203, 204.

Viewed spatially, these lateral boundary surfaces and the shell surface are generally curved outward. Light that propagates in the optical element and strikes this shell surface is preferably reflected, in particular totally reflected, and preferably directed to the point HV. The resulting bundle of light, in particular a bundle of parallel light rays, thus preferably propagates like the light rays that are refracted in the central region of the light coupling region.

With regard to the light rays converging at point HV, shown in FIG. 8-10, it should be noted that this point is located in the far field, for example at 25 meters, on a vertical screen; as such, the emitted light bundle is an actual, parallel beam.

FIG. 11 shows an illumination region or a light distribution LV-FRA, the maximum MAX-FRA of which is at point HV. For example, a first light source 30 is used for this purpose, which emits orange light (in accordance with standards, the color is termed "amber") in order to generate the light distribution of a turn signal lamp.

As a result of the symmetry of the optical element, the light distribution LV-FRA is symmetrical about the line V-V; however, as a result, the light source 30 is not on the optical axis X, but rather above it (and/or above the X, Y plane, the light distribution is not symmetrical about the line H-H, but rather is slightly egg-shaped).

FIG. 12 shows the light distribution LV-TFL generated with the second light source 40, for example a daytime running light distribution. The maximum MAX-TFL is again at the point HV, and the light distribution LV-TFL is symmetrical about the line V-V, but not about the line H-H.

The light distribution LV-TFL of FIG. 12, mirrored around the line H-H, would, however, illuminate the region which is identical to that shown in FIG. 11; with identical light sources, the mirrored light distribution would also be identical to the light distribution of FIG. 11.

The design according to the invention of the optical element makes it possible to realize a focal point in the light coupling region for each of the light sources in such a way that light originating from each of the light sources arranged in a focal point—assuming point light sources—are emitted into the far field to a point, for example (with appropriate alignment) to the so-called HV point, which results in the known manner as the intersection point of the line H-H and the line V-V. The light distribution actually formed by each light source is produced as a result of the actual size of the given light source, with a maximum of the illuminance at the single point, for example at the point HV.

With the solution according to the invention, two spatially separate light sources, in particular LED light sources, can feed light into the optical element, and the light from each of the light sources illuminates in the far field—that is, on a measuring screen approximately 25 meters away from the lighting device—substantially the same illumination region, or the illumination regions of the two light sources are identical.

FIG. 13 finally shows a superimposition of the illumination regions or light distributions of FIG. 12.

The above considerations are based on the assumption that the lighting device 1 more or less directly generates the light distribution and, as described, is oriented in such a way that the point HV is illuminated.

For design reasons, for example, however, it can be desirable that the light sources in a motor vehicle are not oriented in the forward direction, but rather are oriented or must be oriented in a different direction. In this case, as described above, the lighting device would illuminate not a point HV, but rather a different point with the two light sources.

Usually, however, it is desirable to illuminate the point HV as described. In order nevertheless to be able to implement this under the boundary conditions described above, light guide optics 700, for example, are connected upstream of the lighting device 1, which in turn have a light guide optics exit surface 701. The lighting device 1 and the light guide optics 700 together form a lighting system 800.

Light emerging from the light exit surface 11 of the optical element 2 enters the light guide optics 700, propagates in it, and exits via the light guide optics exit surface 701 to form the desired light distribution.

The light guide optics 700 is preferably a solid body that is transparent and light-conducting, and light that falls on its lateral surfaces and propagates in the light guide element 700 is preferably totally reflected.

It is particularly advantageous if the optical element 2 and the light guide element 700 are formed as a single piece together, and from the same material—that is to say, form one element. In this case, the light exit surface 11 of the lighting device 2 is not a real boundary surface, but only an imaginary end surface of the lighting device 2.

The light guide element 700 has an optical axis X1 which typically does not coincide with the optical axis X of the optical element 2 of the lighting device 1. Correspondingly, the point HV is only illuminated with the cooperation of the light guide element 700. The lighting device 1 alone would illuminate another point or, depending on the orientation, not emit any light at all onto a measuring screen in front of a motor vehicle in which it is installed.

As already mentioned, the light guide element 700 has an optical axis X1, a vertical axis Z1, and a horizontal axis Y1 (the statements made at the outset apply to these mutually orthogonal axes). The light guide optics exit surface 701 preferably has an optical structure, in particular cylindrical lenses 702, which expands the light emerging from the light guide optics exit surface 701 in width, that is to say horizontally. For this purpose, the height of these cylindrical lenses 702 preferably runs parallel to the vertical axis Z1, as is indicated in FIG. 19.

As shown in FIGS. 17 and 18, which show a projection of the light guide optics exit surface 701 and the optical element 2 in a vertical plane, the vertical axis Z of the lighting device 2 and the vertical axis Z1 of the light guide optics exit surface 701—regardless of the alignment of the optical axes X and X1 with respect to each other—can run in parallel (see FIG. 17), or can be rotated with respect to each other in the vertical plane (FIG. 18).

With the cylindrical lens structure, an expansion of the emerging light beam can be controlled in a specific direction.

Returning to FIG. 14, this figure shows superimposed light distributions generated with a lighting system 800 as described above. Here again, analogously to the illustration in FIG. 11-13, the point HV is illuminated. The difference here is that the light distributions LV-FRA, LV-TRA and/or respective the illumination regions, are horizontally widened by the cylindrical lenses of the lighting system 800.

In the present invention, for example, the following combinations of lighting functions or the corresponding light distributions can be implemented in general:

1. Light sources, especially LEDs of different colors:
   The first light source 30 generates turn signal indicators, and
   The second light source 40 generates daytime running lights, and optionally a parking light,
   or
   The first light source 30 generates a taillight, and
   The second light source 40 generates a reversing light
2. Light sources, especially LEDs of the same color:
   The first light source 30 generates a parking light, and
   The second light source 40 generates daytime running lights,
   or
   The first light source 30 generates a taillight, and
   The second light source 40 generates a brake light.
3. Light sources, especially LEDs of the same color:
   The two light sources 30, 40 each generate a high beam spot, thus doubling the illuminance.

If a plurality of light exit surfaces of lighting devices or lighting systems according to the invention are arranged next to one another, a turn signal indicator can also be operated in running light mode.

The invention claimed is:

1. A lighting device (1) for a motor vehicle headlight and/or for a rear light of a motor vehicle and/or for a signal light for a motor vehicle headlight, for generating at least two light distributions, or for generating at least two different lighting functions, the lighting device comprising:
   an optical element (2); and
   two light sources (30, 40), a first light source (30) and a second light source (40), in particular LED light sources, wherein each of the light sources (30, 40) can be controlled independently from the other light source or sources,
   wherein the optical element (2) is formed from an optically transparent material, and wherein the optical element (2) has a light coupling region (10) and a light exit surface (11),
   wherein light from the light sources (30, 40), which is introduced into the optical element (2) via the light coupling region (10), exits at least partially via the light exit surface (11),
   wherein the light coupling region (10) is formed from a central light coupling surface (100) and a lateral coupling surface (200) on the side,
   wherein the central light coupling surface (100) is opposite the two light sources (30, 40),
   wherein the lateral coupling surface (200) adjoins the central light coupling surface (100) in such a way that a recess is formed in the optical element (2), in which or opposite from which the light sources (30, 40) are arranged, and into which the light sources (30, 40) emit their light, wherein the two light sources (30, 40) lie on a straight line (G) which runs in a vertical direction (R), which runs parallel to a vertical axis (Z), wherein, viewed in the vertical direction, the first light source (30) lies above the second light source (40), wherein the light coupling region (10) has two focal points (F1, F2), wherein one of the light sources (30) is arranged in one of the focal points (F1) and the other light source (40) is arranged in the other focal point (F2), wherein:

the lateral coupling surface (200) of the light coupling region (10) is configured such that:

in a region which lies, in the vertical direction (R), at least partially or completely above a first horizontal plane (E1) in which the first light source (30) is arranged, the lateral boundary surface (200) has a first, curved lateral boundary surface portion (201), and in a region which lies at least partially or completely below a second horizontal plane (E2) in the vertical direction (R), in which the second light source (40) is arranged, the lateral boundary surface (200) has a second, curved lateral boundary surface portion (202), the horizontal planes (E1, E2) are planes which extend parallel to a plane (X, Y) to which the vertical axis (Z) is orthogonal, and which contains the optical axis (X), the two lateral boundary surface portions (201, 202) are connected to one another via lateral boundary surface connecting portions (203, 204), and the central light coupling surface (10) is designed as follows:

starting from each lateral boundary surface connecting portion (203, 204), a central coupling surface (103, 104) extends in the direction of the other lateral boundary surface connecting portion (204, 203), the central coupling surfaces (103, 104) converging and terminating at a single central edge (110);

above and below the central coupling surfaces (103, 104) extend two connection coupling surfaces (101, 102) which connect the central coupling surfaces (103, 104) with the lateral boundary surface portions (201, 202), and wherein the central coupling surfaces (103, 104) are concavely curved in horizontal sectional planes, that is, sectional planes which run parallel to a plane (X, Y) to which the vertical axis (Z) is orthogonal, and which contains the optical axis (X), such that concave central coupling surface contours (103", 104") result.

2. The lighting device according to claim 1, wherein the lateral boundary surface connecting portions (203, 204) have a straight connecting portion contour (203', 204') in first vertical sectional planes, that is, sectional planes which run parallel to a plane (Y, Z) to which the optical axis (X) is orthogonal, and which contains the vertical axis (Z).

3. The lighting device according to claim 1, wherein the lateral boundary surface connecting portions (203, 204) have a convex connecting portion contour (203", 204") in horizontal sectional planes, that is, sectional planes which run parallel to a plane (X, Y) to which the vertical axis (Z) is orthogonal, and which contains the optical axis (X).

4. The lighting device according to claim 1, wherein the lateral boundary surface portions (201, 202) have a concavely curved lateral boundary surface portion contour (201', 202') in first vertical sectional planes, that is, sectional planes which run parallel to a plane (Y, Z) to which the optical axis (X) is orthogonal, and which contains the vertical axis (Z).

5. The lighting device according to claim 1, wherein the lateral boundary surface portions (201, 202) are convexly curved.

6. The lighting device according to claim 1, wherein the central coupling surfaces (103, 104) are straight in the vertical direction (Z, R), such that straight central coupling surface contours (103', 104') which preferably run parallel to the single central edge (110) are produced in second vertical sectional planes, that is, sectional planes that are parallel to a plane (X, Z) which is spanned by the optical axis (X) and the vertical axis (Z).

7. The lighting device according to claim 1, wherein each of the connection coupling surfaces (101, 102) is divided into two partial connection coupling surfaces (101a, 101b, 102a, 102b) by a connecting edge (120, 130).

8. The lighting device according to claim 7, wherein the connecting edges (120, 130), viewed in the vertical direction, run in the same direction as the central edge (110).

9. The lighting device according to claim 7, wherein the connecting edges (120, 130) are designed to be concavely curved in second vertical sectional planes (X, Z).

10. The lighting device according to claim 7, wherein each of the partial connection coupling surfaces (101a, 101b, 102a, 102b) is designed to be concavely curved.

11. The lighting device according to claim 1, wherein the light coupling region (10) and/or the optical element (2) is/are symmetrical with respect to a plane (X, Y) which is spanned by the optical axis (X) and a horizontal axis (Y), and/or with respect to the vertical sectional plane (X, Z) which is spanned by the optical axis (X) and the vertical axis (Z).

12. The lighting device according to claim 7, wherein the central edge (110) connects to a connecting edge (120, 130) in a connection point (P1, P2), and wherein each of the focal points (F1, F2) lies on a focal line (FG1, FG2), wherein a focal line (FG1, FG2) runs through a connection point (P1, P2) and parallel to the optical axis (X).

13. The lighting device according to claim 12, wherein the first focal point (F1) has the same distance (a1) from its connection point (P1) as the distance (a2) of the second focal point (F2) from its connection point (P2).

14. The lighting device according to claim 1, wherein the light coupling region (10) is connected to the light exit surface (11) via a shell surface (500).

15. The lighting device according to claim 14, wherein the shell surface (500) is straight in the vertical direction (R) in regions (503, 504) adjoining the lateral boundary surface connecting portions (203, 204).

16. The lighting device according to claim 1, wherein the light sources (30, 40) each comprise at least one light-emitting diode or consist of one light-emitting diode.

17. The lighting device according to claim 1, wherein each light source (30, 40) has a primary emission direction.

18. The lighting device according to claim 17, wherein the primary emission directions of the light sources (30, 40) run parallel to the optical axis (X) of the optical element (2).

19. The lighting device according to claim 1, wherein the lighting device is designed as a motor vehicle headlight or rear light of a motor vehicle or as a signal light for a motor vehicle.

20. A lighting system (800) comprising
a lighting device according to claim 1; and
a light guide element (700), into which light from the optical element (2) of the lighting device (1) can be coupled, wherein said light can emerge from the light guide element (700) via a light guide optics exit surface (701) to form one, two or more light distributions.

21. The lighting system according to claim 20, wherein the light guide optics exit surface (701) has cylindrical lenses (702) which run in the direction of a vertical axis (Z1) of the light guide element (700).

22. The lighting system according to claim 20, wherein an optical axis (X1) of the light guide element (700) and the optical axis (X) of the optical element (2) of the lighting device (1) do not coincide, and in particular are rotated with respect to each other by an angle.

23. The lighting system according to claim 20, wherein viewed in a projection in a vertical plane, the vertical axis (Z) of the optical element (2) and the vertical axis (Z1) of the light guide element (700) run parallel or not parallel to one another.

24. The lighting system according to claim 20, wherein the lighting system is designed as a motor vehicle headlight or rear light of a motor vehicle or signal light for a motor vehicle.

25. A device comprising at least one lighting device (1) according to claim 1, wherein the device is a motor vehicle headlight or a rear light for a motor vehicle or a signal light for a motor vehicle.

\* \* \* \* \*